UNITED STATES PATENT OFFICE.

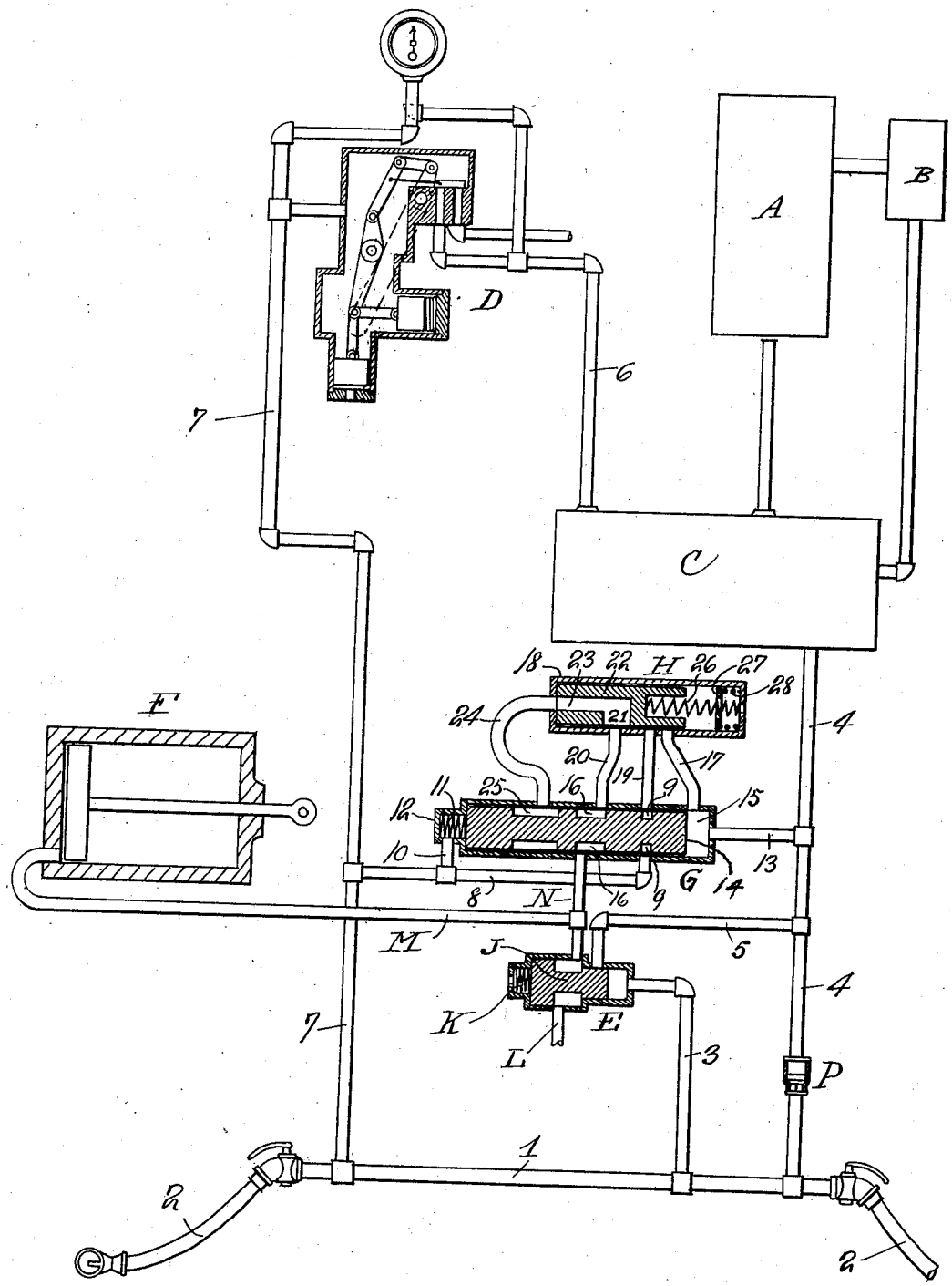

HAROLD ROWNTREE, OF CHICAGO, ILLINOIS.

AIR-BRAKE EQUIPMENT FOR CARS.

No. 890,932.   Specification of Letters Patent.   Patented June 16, 1908.

Application filed March 30, 1907. Serial No. 365,554.

*To all whom it may concern:*

Be it known that I, HAROLD ROWNTREE, a citizen of the United States, residing at Chicago, in the county of Cook and State of Illinois, have made a certain new and useful Invention in Air-Brake Equipments for Cars, of which the following is a specification.

This invention relates to air brake equipment for cars.

The object of the invention is to provide an air brake equipment for cars, and, particularly, equipments for cars designed to be connected up as multiple units in a train, each car having its own pump and tank, as well as its own brake equipment, but coupled up to the brake systems of the other cars in the train.

A further object of the invention is to provide an air brake equipment of the nature referred to wherein, in case the pump on any car breaks down, or is, for any reason, thrown out of commission, then the tank on such car may be supplied with pressure through the train pipe from the tanks and pumps on the other cars.

A further object of the invention is to provide means for equalizing the pressure throughout the train of cars in case the pump on one of the cars should fail to operate.

Other objects of the invention will appear more fully hereinafter.

The invention consists substantially in the construction, combination, location, and relative arrangement of parts, all as will be more fully hereinafter set forth, as shown in the accompanying drawing and finally pointed out in the appended claims.

The single view of the accompanying drawing shows diagrammatically with parts in section, an air brake equipment for a single car, embodying the principles of my invention.

In carrying out my invention I equip each car with a pump A, a governor B, a pressure tank C, a train pipe or pressure control mechanism, indicated generally by reference sign D, a triple valve E, a brake cylinder F, and brake rigging, not shown, operated thereby. These parts may be of the usual or any well known, suitable or convenient construction and arrangement, such as is ordinarily employed in apparatus of this kind. In practice, however, I prefer to employ a train pipe or pressure control mechanism of such construction and arrangement as to operate automatically to maintain the train pipe pressure uniform, such pressure always bearing a definite relation to the position of the control handle regardless of leakage at any point in the system, regardless of the length of time the control handle remains in the position which it occupies, and regardless of whether it has been moved in one direction or the other to cause an increase or a decrease of the previously maintained pressure. I have shown such control mechanism but do not claim the same herein as it forms the subject of a separate application Serial No. 365,552, filed March 30, 1907. I also prefer, in practice, to employ a triple valve which is operated automatically under the conjoint action of the train pipe pressure, the brake cylinder pressure, and an independent force arranged to oppose the action thereon of the train pipe pressure, and therefore, a triple valve which automatically adjusts itself to maintain uniform pressure in the brake cylinder in exactly inverse relation and proportion to the train pipe pressure. I have shown such a valve, but do not claim the same herein as it forms the subject matter of another application Serial No. 365,551, filed March 30, 1907. And while I have shown a control mechanism, and triple valve, of the nature referred to, and prefer to use them, still, my present invention is not to be limited or restricted to the use of the same, as other forms, constructions, and arrangements may be employed without departure from the spirit and scope of my present invention.

In addition to the parts of the equipment above mentioned, I also supply each car with an equalizing valve, indicated generally by reference sign G, a cut-off valve H, and suitable pipe connections which I will hereinafter explain in the relation, arrangement and connections thereof, necessary and suitable for the accomplishment of my objects and purposes.

Reference sign 1, designates a pipe on each car and adapted to be connected at each end thereof through hose couplings 2, to corresponding pipes on the next adjacent cars, thereby constituting the train pipe. A pipe 3, delivers from the train pipe 1 to the end of the casing of the triple valve. The pressure thus imposed upon the piston J, is opposed by any suitably arranged pressure medium, preferably a spring K, the movement of said valve being controlled by the relation of the train pipe pressure and the pressure or tension of said opposing medium. The triple valve controls an exhaust port L, and also a supply connection M, and N, to the brake cylinder and to the equalizing valve G, respectively. A pipe 4, connects the train pipe 1, and tank C. In this connection is arranged a check valve P, which is arranged to seat toward the train pipe. Between the check valve P and the tank C, a pipe 5, delivers from the said pipe 4, to the triple valve casing, such connection being controlled by the triple valve.

The operation of the apparatus so far described is as follows; supposing that a train pipe pressure of 70 pounds is required to hold said valve in position to open the brake cylinder to exhaust, and to close the connection 5. Now suppose the train pipe pressure is lowered to 60 pounds, then the triple valve will operate, first to close the exhaust port connection L, then to open the tank connection 5, to the brake cylinder through the connection M, and to the equalizing valve through connection N. If the tank pressure tends to fall below the train pipe pressure then the valve P, will unseat and the train pipe pressure is admitted through connection 5, to the triple valve and brake cylinder. It will be seen that by means of the opposing pressures on the triple valve afforded by the train pipe pressure through connection 3, assisted by the brake cylinder pressure operating between the pistons and the opposing medium, as, for instance, the spring K, the position of the valve automatically adjusts itself according to variations in the train pipe pressure, whether produced by the manipulation of the controlling valve or by leakage at any point in the system. The tank C, is connected through pipe 6, with the controlling mechanism D, and a pipe 7, leads from the controlling mechanism to the train pipe 1, and constitutes a branch of said train pipe; from pipe 7, leads a pipe connection 8, which communicates with a port 9, of the equalizing valve casing. Also from pipe 8, a pipe connection 10, leads to the chamber 11, at one end of the equalizing valve. In this chamber is arranged a spring 12 or other pressure device. A chamber 15 at the other end of the equalizing valve casing is connected through a pipe 13, with the tank pipe 4. From this it will be seen that when the tank pressure exceeds the train pipe pressure supplemented by the pressure of spring 12, the equalizing valve 14, is held in the position shown in the drawing. When, however, the train pipe pressure supplemented by the pressure of spring 12, exceeds that of the tank, the equalizing valve will be shifted to the right from the position shown in the drawing. The pipe N, from the triple valve delivers to a port 16, of the equalizing valve. A pipe 17, extends from chamber 15, to the cut-off valve casing 18. A pipe 19, connects the equalizing valve port 9, with the cut-off valve casing, and a pipe 20, connects the equalizing valve port 16, with a port opening 21, in the cut-off valve casing and controlled by the cut-off valve 22. The cut-off valve 22, has a passage 23, which connects through a pipe 24, with a port 25, of the equalizing valve. The cut-off valve 22, is normally held in the position shown in the drawing, by means of a spring 26, or other means, while a yielding stop device 27, limits the movement of said valve, said stop device being operated on by a strong spring 28.

In practice the pump A may maintain any desired degree of pressure in the tank C.
Ordinarily a pressure of from 90 to 100 pounds in the tank C, is sufficient. The brakes may be entirely released at any suitable or desired degree of train pipe pressure. Ordinarily a train pipe pressure of 70 pounds is sufficient for this purpose. Now, with the various parts occupying the relative positions as shown in the drawing, that is, with the train pipe pressure so regulated that the brakes are entirely released, suppose it is desired to make application of the brakes. To accomplish this the train pipe pressure is reduced, say to 60 pounds. Thereupon the triple valve J moves to the right, closing exhaust port L, and opening the tank connection 5, through pipe M, to the brake cylinder F, and hence effecting an application of the brakes. At the same time the tank pressure is admitted through pipe N, to port 16, and pipe 20, to port 21, of the cut-off valve, and passage 23 therein. This pressure causes the cut-off valve 22, to move towards the right, against the action of spring 26, thereby uncovering the connection 19 in the cut-off valve casing, and hence admitting the train pipe pressure to the cut-off valve through pipe 8, port 9, and pipe 19. This pressure causes the cut-off valve to bear firmly against its yielding stop 27. It will be remembered that when this operation takes place the train pipe pressure has been reduced to 60 pounds pressure or less in order to effect an application of the brakes. Now, suppose it is desired to release the brakes. To accomplish this the train pipe pressure is increased again to, say 70 pounds. This increased pressure being applied to the cut-off valve through the pipe 8, port 9, and pipe 19, causes said cut-off valve to move still further towards the right, thereby causing the limit stop 27, to yield against the action of spring 28, and hence, eventually opening communication between the pipes 19, and 17, through port 21, thereby directly connecting the tank and train pipe, as follows:
from the tank C, through pipe 4, pipe 13, chamber 15, of the equalizing valve, pipe 17, port 21, pipe 19, port 9, and pipe 8. This operation will take place on every car of the train since all the brakes are released when the train pipe pressure is 70 pounds, in the example given. The tank pressure being, as above noted, from 90 to 100 pounds, it will be seen that the tank pressure is at once supplied from each car into the train pipe, and hence an equalization of pressure in the tanks and train pipe takes place instantly throughout the entire train, and hence any tank having a lower pressure than that of the other tanks, due to any stoppage of its pump or other derangement, is again supplied with pressure which is thus equalized throughout the train.

As soon as the equalization of pressure throughout the tanks and train pipes of the train is accomplished, the time required therefor being only a few seconds, the pressures on opposite ends of the equalizing valve, afforded by the tank connections 13, and the train pipe connection 10, respectively, balance each other, and hence the tension of the independent pressure medium acting upon the equalizing valve, in this instance the spring 12, becomes effective to shift said valve 14, towards the right, thereby closing the connections of pipes 17, and 19, to the tank and train pipe, respectively, and bringing port 25, into connection with pipe N, the triple valve and exhaust L, thereby withdrawing all pressure against the end of the cut-off valve in opposition to the springs 28, and 26. Instantly this is done said springs become effective to return or restore the cut-off valve 22, to its normal or initial cut off position, ready for the next operation.

It will be observed from the operations described that all the tanks throughout the train are now cut off from the train pipe except through the control mechanisms D, and hence no air can enter the train pipe from any tank. When, however, the train pipe pressure is again lowered, the equilibrium of the tank and train pipe pressures on opposite ends of the equalizing valve is destroyed and hence, under the influence of the tank pressure, said valve 14, is again moved to its initial position, as shown in the drawing, but the cut-off valve, which has previously returned to its normal or initial position, as above described, cannot be moved until a sufficient reduction of train pipe pressure to cause an application of the brakes takes place.

In case the tank pressure is below that of the train pipe, or in case the tank and train pipe pressure on any car should equalize before the train pipe pressure reaches its maximum, thereby causing the equalizing valve to be inopportunely operated, the check valve P, will operate to admit the excess of train pipe pressure to the tank, and hence avoid the undue operation of the equalizing valve preventing the tank pressure reaching its maximum.

From the foregoing description it will be seen that I provide an exceedingly simple and efficient air brake equipment for cars, wherein each car is supplied with its own equipment, and wherein equalization of pressure takes place throughout the train in case any one or more of the pumps on different cars should become disabled or thrown out of commission, thereby providing, in each emergency, ample supply of pressure throughout the train for the operation of the brakes, and with only a single hose connection between adjacent cars.

While the arrangement above described is well adapted for use generally on cars, it is specially adapted for use on electric cars for use in trains, as in elevated, sub-way or underground, or surface interurban use. I do not desire, however, to be limited or restricted in this respect.

While I have shown and described a specific construction and arrangement of mechanism embodying the principles of my invention, it is to be understood that many variations and changes in the details thereof might readily occur to persons skilled in the art and still fall within the spirit and scope of my invention. In its broad aspect, therefore, my invention is not to be limited or restricted to the exact and specific details of construction and arrangement shown and described; but Having now set forth the object and nature of my invention, and a construction embodying the principles thereof, and having explained such construction, and the purposes, objects and operation thereof, what I claim as new and useful and of my own invention and desire to secure by Letters Patent is:

1. In an air brake equipment for cars, the combination with a main pressure tank, a brake mechanism, pipe connections therebetween, a valve for controlling said connections, a train pipe also having pipe connections with the main pressure tank, and pipe connections between the train pipe and valve, of means for equalizing the pressure between the tank and train pipe.

2. In an air brake equipment for cars, the combination with a train pipe, a main pressure tank, and brake mechanism, a triple valve for controlling the communication between the main tank and brake mechanism, of means for automatically equalizing the pressure between the train pipe and tank.

3. In an air brake equipment for cars, the combination with a train pipe, an air tank, and a brake mechanism, of a triple valve, for controlling the supply of pressure to the brake mechanism, and means controlled by variations in train pipe pressure for equalizing the pressure between the tank and train pipe.

4. In an air brake equipment for cars, the combination with a train pipe, an air tank and brake mechanism, of means for controlling the train pipe pressure, and means controlled by variations in train pipe pressure for equalizing the pressure between the train pipe and tank.

5. In an air brake equipment for cars, the combination with a train pipe, an air tank, and a brake mechanism, of means for controlling the train pipe pressure, means controlled by variations in the train pipe pressure for controlling the supply of pressure to the brake mechanism, and means controlled by the brake pressure controlling means for equalizing the pressure between the tank and train pipe.

6. In an air brake equipment for cars, the combination with a train pipe, an air tank and a brake mechanism, of a triple valve for controlling the supply of pressure to the brake mechanism, and arranged to be controlled by variations in the train pipe pressure, means for controlling the train pipe pressure, and means initially controlled by said valve for equalizing the tank and train pipe pressure.

7. In an air brake equipment for cars, the combination with a train pipe, a tank and a brake mechanism, of a triple valve for controlling the supply of pressure to the brake mechanism, an equalizing valve having connections respectively with the tank and train pipe, a cut-off valve for controlling said connections, said cut-off valve being controlled by the equalizing valve.

8. In an air brake equipment for cars, the combination with a train pipe, a tank, a brake mechanism, and a triple valve, of an equalizing valve having connections respectively with the tank and train pipe and a cut-off valve for controlling communication between said connections.

9. In an air brake equipment for cars, the combination with a train pipe, a tank, a brake mechanism and a triple valve, of an equalizing valve having connections respectively with said tank and train pipe, an auxiliary power medium operating on said valve and automatic devices for controlling communication between said connections.

10. In an air brake equipment for cars, the combination with a triple valve, a tank, a brake mechanism and a triple valve, of an equalizing valve having connection with the tank and train pipe respectively, means arranged to exert a pressure upon said valve in opposition to the tank pressure and automatic devices controlled by the triple valve for controlling communication between said connections.

11. In an air brake equipment for cars, the combination with a train pipe, a tank, a brake mechanism and a triple valve having connection with the tank and train pipe respectively, and a spring arranged to exert its pressure upon said valve in opposition to the tank pressure, of pressure operated devices controlled by said valve for equalizing the train and tank pressures.

12. In an air brake equipment for cars, the combination with train pipe, a tank, a brake mechanism, and a triple valve, of connections between the tank and train pipe, and an automatic valve controlled by the triple valve and arranged to control said connections.

13. In an air brake equipment for cars, the combination with a train pipe, a tank, brake mechanism, and a triple valve, of connections between said tank and train pipe, and means arranged in said connections, and controlled by the conjoint action of the train pipe and tank pressure for equalizing said pressures and a cut-off valve for controlling said means.

14. In an air brake equipment for cars, the combination with a train pipe, a tank, brake mechanism, and a triple valve, of pressure equalizing connections between the tank and train pipe and an automatic cut-off mechanism for said connections.

15. In an air brake equipment for cars, the combination with a train pipe, a tank, brake mechanism, and a triple valve, of pressure equalizing connections between said tank and train pipe, cut-off means arranged in such connections and a valve for controlling said cut-off mechanism.

16. In an air brake equipment for cars, the combination with a train pipe and tank, of pressure equalizing connections therebetween, and pressure means for automatically controlling said connections.

17. In an air brake equipment for cars, the combination with a train pipe and tank, of pressure equalizing connections therebetween, and means controlled by variations in the train pipe pressure for automatically controlling said connections.

18. In an air brake equipment for cars, a train pipe and a tank, pressure equalizing connections therebetween, a cut-off valve for said connections, and means for automatically controlling said cut-off valve.

19. In an air brake equipment for cars, a train pipe and a tank, pressure equalizing connections therebetween, a normally closed cut-off valve arranged in said connections, and means for automatically operating said valve.

20. In an air brake equipment for cars, a train pipe and a tank, pressure equalizing connections therebetween, a cut-off valve arranged in said connections, a spring arranged to normally maintain said spring in position to close said connections, and means for supplying train pipe and tank pressures to said valve to operate the same.

21. In an air brake equipment for cars, a train pipe and a tank, pressure equalizing connections therebetween, a cut-off valve for said connections, and an equalizing valve for controlling said cut-off valve.

22. In an air brake equipment for cars, a train pipe and a tank, pressure equalizing connections therebetween a cut-off valve arranged in such connections, said valve being normally closed and adapted to be opened by the conjoint action of the train pipe and tank pressures, and an equalizing valve for controlling said pressures.

23. In an air brake equipment for cars, a train pipe and a tank pressure equalizing connections therebetween, an auxiliary connection between said tank and train pipe, and a check valve arranged in said auxiliary connection.

24. In an air brake equipment for cars, a train pipe having hose couplings for connection with the train pipes on adjacent cars, a tank, pressure equalizing connections between said train pipe and tank, a triple valve, and means initially controlled by said valve for controlling said pressure equalizing connections.

25. In an air brake equipment for cars, the combination with a tank on each car, a triple valve and a brake mechanism on each car, of a train pipe for controlling the brake mechanisms, and means initially controlled by said valve for equalizing the pressure in the tanks through said train pipe.

26. In an air brake equipment for cars, the combination of a pressure tank and a brake mechanism on each car, a train pipe, means for controlling the train pipe pressure, and pneumatically operated means for equalizing the pressure in the tanks through the said train pipe.

27. In an air brake equipment for cars, the combination of a pressure tank on each car, a train pipe, pressure equalizing connections between the tanks and the said train pipe, automatic pneumatically operated means controlled by variations in train pipe pressure for controlling said pressure equalizing connections, and means for controlling the pressure in the train pipe.

28. In an air brake equipment for cars, the combination of a pressure tank on each car, a train pipe having connections with all the tanks, and including means for controlling the pressure in said train pipe, and pressure equalizing connections between the tanks and said train pipe.

29. In an air brake equipment for cars, the combination of a pressure tank and a brake mechanism on each car, a train pipe having connections with each tank and including means for controlling the pressure in said train pipe, means controlled by variations in the train pipe pressure for controlling the operation of the brake mechanisms, and pressure equalizing connections between said tanks and said train pipe, said pressure equalizing connections also controlled by variations in the train pipe pressure.

In testimony whereof I have hereunto set my hand in the presence of the subscribing witnesses, on this 28th day of March A. D., 1907.

HAROLD ROWNTREE.

Witnesses:
 JOSEPH KLEIN,
 S. C. DARBY.